(12) United States Patent
Mathern et al.

(10) Patent No.: US 9,085,309 B2
(45) Date of Patent: Jul. 21, 2015

(54) SPRING-APPLIED PARKING BRAKE WITH BALL SCREW RESET MECHANISM

(71) Applicant: Wabtec Holding Corp., Wilmerding, PA (US)

(72) Inventors: Peter D. Mathern, Greenville, SC (US); Joseph Michael Dixon, Greer, SC (US)

(73) Assignee: Wabtec Holding Corp., Wilmerding, PA (US)

( * ) Notice: Subject to any disclaimer, the term of this patent is extended or adjusted under 35 U.S.C. 154(b) by 0 days.

(21) Appl. No.: 14/096,200

(22) Filed: Dec. 4, 2013

(65) Prior Publication Data

US 2014/0151162 A1 Jun. 5, 2014

Related U.S. Application Data

(60) Provisional application No. 61/733,456, filed on Dec. 5, 2012.

(51) Int. Cl.
*F16D 65/22* (2006.01)
*B61H 13/02* (2006.01)
(Continued)

(52) U.S. Cl.
CPC .............. *B61H 13/02* (2013.01); *B60T 17/086* (2013.01); *B61H 13/005* (2013.01); *F16D 2121/16* (2013.01); *F16D 2125/36* (2013.01); *F16D 2127/04* (2013.01)

(58) Field of Classification Search
CPC ............ F16D 2121/06; F16D 2121/10; F16D 2121/12; F16D 2121/16; F16D 2123/00; F16D 2125/20; F16D 2125/34; F16D 2125/36; F16D 2125/40; F16D 2127/02; F16D 2127/04; B60T 17/086

USPC ................................................ 188/170; 92/29
See application file for complete search history.

(56) References Cited

U.S. PATENT DOCUMENTS 1,818,554 A * 8/1931 Head ............................ 74/459.5
3,803,940 A * 4/1974 La Belle ......................... 74/505
(Continued)

FOREIGN PATENT DOCUMENTS

| DE | 2542122 | * | 9/1975 | ............ B60T 17/086 |
| DE | 4217231 A1 | * | 11/1993 | ............. B61H 13/00 |
| GB | 2065774 A | * | 7/1981 | ............. F15B 15/02 |

OTHER PUBLICATIONS

Machine Translation of DE 4217231 (no date).*

(Continued)

*Primary Examiner* — Nicholas J Lane
(74) *Attorney, Agent, or Firm* — The Webb Law Firm (57) ABSTRACT

A parking brake for a railway vehicle includes a pneumatic cylinder having a cylinder wall, a first wall opposite a second wall, and a piston movable within the pneumatic cylinder. At least one spring extends between the piston and the second wall for biasing the piston against the first wall. A gear box is fixed relative to the second wall and includes a hand wheel. A spindle is operatively connected to the gear box to affect movement of a manual reset mechanism having a threaded shaft and a ball screw nut rotatably engaged with the threaded shaft. A pushrod is connected to the manual reset mechanism and extends through the cylinder and the first wall. When the hand wheel is rotated, the manual reset mechanism is rotated to cause the pushrod to move relative to the piston corresponding to the direction of the rotation of the hand wheel.

18 Claims, 7 Drawing Sheets

(51) Int. Cl.
   *B60T 17/08*   (2006.01)
   *B61H 13/00*   (2006.01)
   *F16D 127/04*   (2012.01)
   *F16D 121/16*   (2012.01)
   *F16D 125/36*   (2012.01)

(56) References Cited

U.S. PATENT DOCUMENTS

| | | | |
|---|---|---|---|
| 3,895,695 A | * | 7/1975 | Hunter ............... 188/170 |
| 3,994,205 A | * | 11/1976 | Ekdahl et al. ............. 92/29 |
| 4,036,111 A | * | 7/1977 | Dahlkvist et al. .......... 92/29 |
| 4,063,491 A | * | 12/1977 | Roger et al. ............. 92/130 A |
| 4,273,388 A | | 6/1981 | Muller |
| 4,478,319 A | * | 10/1984 | Casalone et al. .......... 188/170 |
| 4,480,531 A | * | 11/1984 | Mylius et al. ............. 92/29 |
| 4,545,465 A | * | 10/1985 | Engle .................. 188/72.3 |
| 6,279,689 B1 | | 8/2001 | Zemyan |
| 6,378,668 B1 | | 4/2002 | Zemyan et al. |
| 6,799,502 B2 | * | 10/2004 | Wolfsteiner et al. ........ 92/29 |
| 2009/0308700 A1 | * | 12/2009 | Mathern ................. 188/167 |
| 2011/0266101 A1 | | 11/2011 | Sommerfeld et al. |

OTHER PUBLICATIONS

Machine Translation of DE 2542122 (no date).*

* cited by examiner

SPRING-APPLIED PARKING BRAKE WITH BALL SCREW RESET MECHANISM

CROSS REFERENCE TO RELATED APPLICATION

This application claims the benefit of U.S. Provisional Application No. 61/733,456 filed Dec. 5, 2012 and entitled "Spring-Applied Parking Brake With Ball Screw Reset Mechanism", the disclosure of which is incorporated herein by reference in its entirety.

BACKGROUND OF THE INVENTION

1. Field of the Invention

The present disclosure relates to spring-applied parking brakes for railway vehicles which normally are released by use of pneumatic pressure. This disclosure further relates to manual release and reapplication of the parking brake, for example, using a ball screw reset mechanism.

2. Description of Related Art

Service brakes for railway vehicles are normally applied by pneumatic cylinders supplied with pressurized air by a lead locomotive or engine. When the railway vehicle is separated from the lead locomotive, such as during the process of composing a train, a parking brake is desirable to prevent runaway motion of the railway vehicle. Typically, the parking brake is spring applied. Pushrods connected to spring-actuated pistons connect with linkages to effect braking function when the railway vehicle is not coupled to the lead locomotive. The spring-applied brakes can be released by pneumatic pressure once the vehicle is reconnected to a lead vehicle or a source of pressurized air.

In some prior art spring-applied brakes, a manual release is provided for disconnecting the piston from the pushrod, thus permitting movement of the vehicle. In other prior art, the application and release of the parking brake force is effected with either air pressure or with a mechanical winding action. In this case, the connection between the spring-driven piston and the pushrod is controlled by a nut threaded on the pushrod, the rotation of which is caused by a manual means, such as a hand wheel. This arrangement utilizes a conventional threaded connection between the nut and the pushrod, thereby requiring a significant manual input in order to actuate the manual release of the spring-applied brake. In certain embodiments, over 40 rotations of the hand wheel may be necessary before the spring-applied force is released and the railway vehicle may be moved. This process is very inefficient and requires a substantial amount of time and manual exertion. Additionally, conventional spring-applied brakes take a significant amount of time to manually apply or release. Accordingly, there is a need in the art for a spring-applied railway vehicle parking brake that overcomes the various inefficiencies of the prior art.

SUMMARY OF THE INVENTION

Briefly, according to one embodiment, there may be provided a spring-applied parking brake with a manual release and reapply, having a pneumatic cylinder with a cylinder wall and a first wall opposite a second wall. A piston may be movable within the pneumatic cylinder and sealed relative to the cylinder wall. At least one spring may extend between the piston and second wall for biasing the piston against the first wall when the pneumatic cylinder is depressurized. The parking brake may further include a pneumatic pressure inlet for applying pressure to move the piston against the spring force toward the second wall. A hand wheel may be provided with spindle that is operatively connected to the hand wheel to affect movement of a manual reset mechanism. In one embodiment, a pushrod may be connected to the manual reset mechanism and extend through the cylinder and the first wall. When the hand wheel is rotated manually, the manual reset mechanism is rotated to cause the pushrod to move relative to the piston corresponding to the direction of the rotation of the hand wheel.

In accordance with another embodiment, the manual reset mechanism for the parking brake may include a threaded shaft having a first end slidably connected to a first end of the spindle and a second end connected to the pushrod and a ball screw nut rotatably engaged with the threaded shaft. The ball screw nut may be fixedly positioned relative to the piston. The threaded shaft may be hollow and include a key slot for slidably engaging a key extending through the spindle. The ball screw nut may be set within a sleeve connected to the piston.

In accordance with a further embodiment, the spring-applied parking brake may include a pair of concentric springs. The hand wheel may be connected to a gear box having a first bevel gear engaging a second bevel gear. The first and second bevel gears may have straight or spiral teeth. In yet another embodiment, a second end of the spindle has a toothed ratchet releasably engaged to a release pin mechanism. The release pin mechanism may include a spring-loaded pullout pin that is selectively engagable with the toothed ratchet. Furthermore, the hand wheel may be connected to a gear box including a shaft having a first shaft portion selectively engagable with a second shaft portion or by selectively engagable gears within the gear box. The first shaft portion and the second shaft portion may be selectively engagable via a spring-loaded mechanism.

According to yet another embodiment, a parking brake for a railway vehicle includes a pneumatic cylinder having a cylinder wall and first and second walls. A piston may be movable within the pneumatic cylinder and sealed relative to the cylinder wall. At least one spring may extend between the piston and second wall for biasing the piston against the first wall when the pneumatic cylinder is depressurized. A pneumatic pressure inlet may be provided for applying pressure to move the piston against the spring force toward the second wall. A hand wheel may be provided with spindle that is operatively connected to the hand wheel to affect movement of a manual reset mechanism having a threaded shaft with a first end slidably connected to a first end of the spindle and a second end connected to the pushrod and a ball screw nut rotatably engaged with the threaded shaft. A pushrod may be connected to the manual reset mechanism and extend through the cylinder and the first wall. When the hand wheel is rotated manually, the manual reset mechanism may be rotated to cause the pushrod to move relative to the piston corresponding to the direction of the rotation of the hand wheel.

BRIEF DESCRIPTION OF THE DRAWINGS

Further features and other objects and advantages will become apparent from the following detailed description made with reference to the drawings in which.

DETAILED DESCRIPTION OF THE INVENTION

For purposes of the description hereinafter, the terms "upper", "lower", "right", "left", "vertical", "horizontal", "top", "bottom", "lateral", "longitudinal", and derivatives thereof, shall relate to the embodiment as it is oriented in the drawing figures. However, it is to be understood that the depicted embodiment may assume alternative variations and step sequences, except where expressly specified to the contrary. It is also to be understood that the specific devices and processes illustrated in the attached drawings, and described in the following specification, are simply exemplary embodiments. Hence, specific dimensions and other physical characteristics related to the embodiments disclosed herein are not to be considered as limiting.

Figure 1:
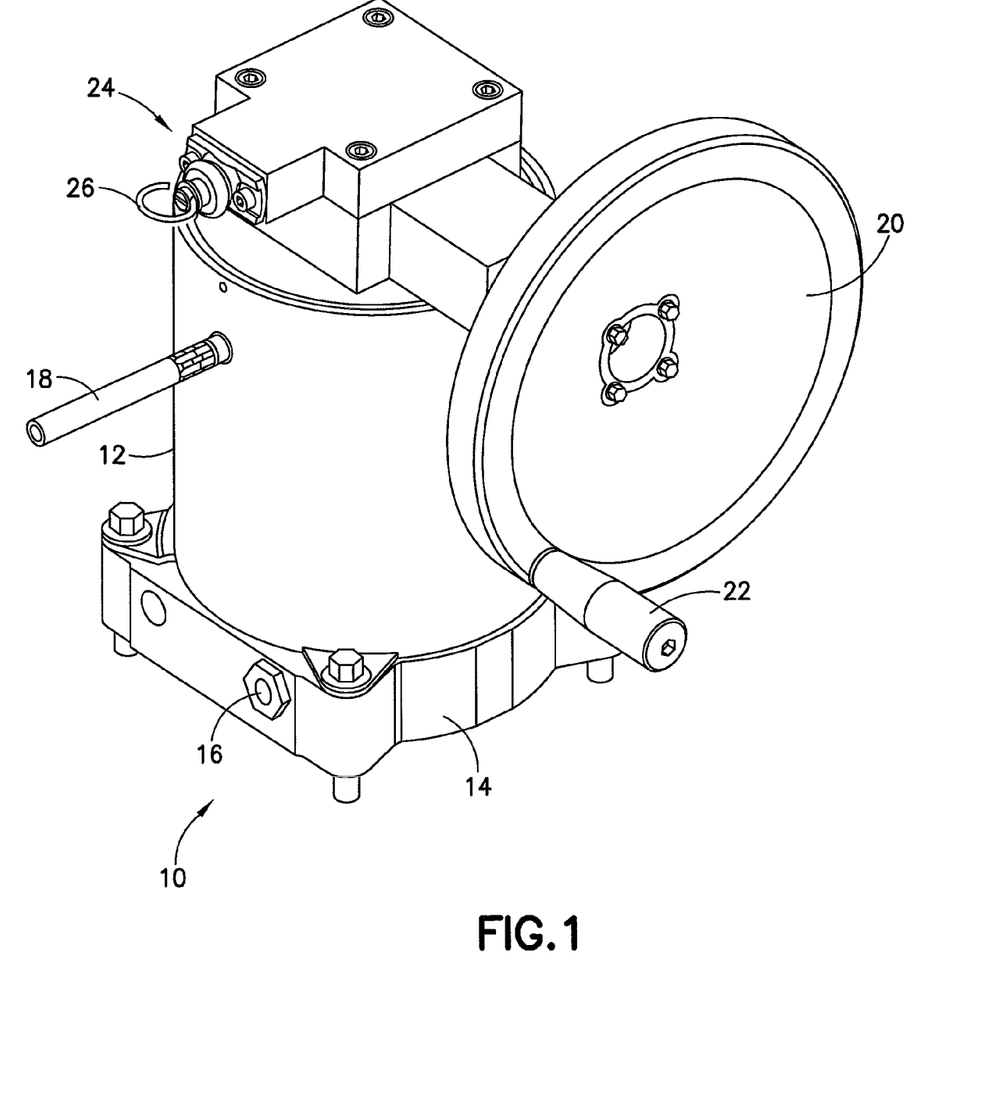
FIG. 1 is a perspective view of a spring-actuated parking brake in a manually-released state according to one embodiment.
Figure 2:
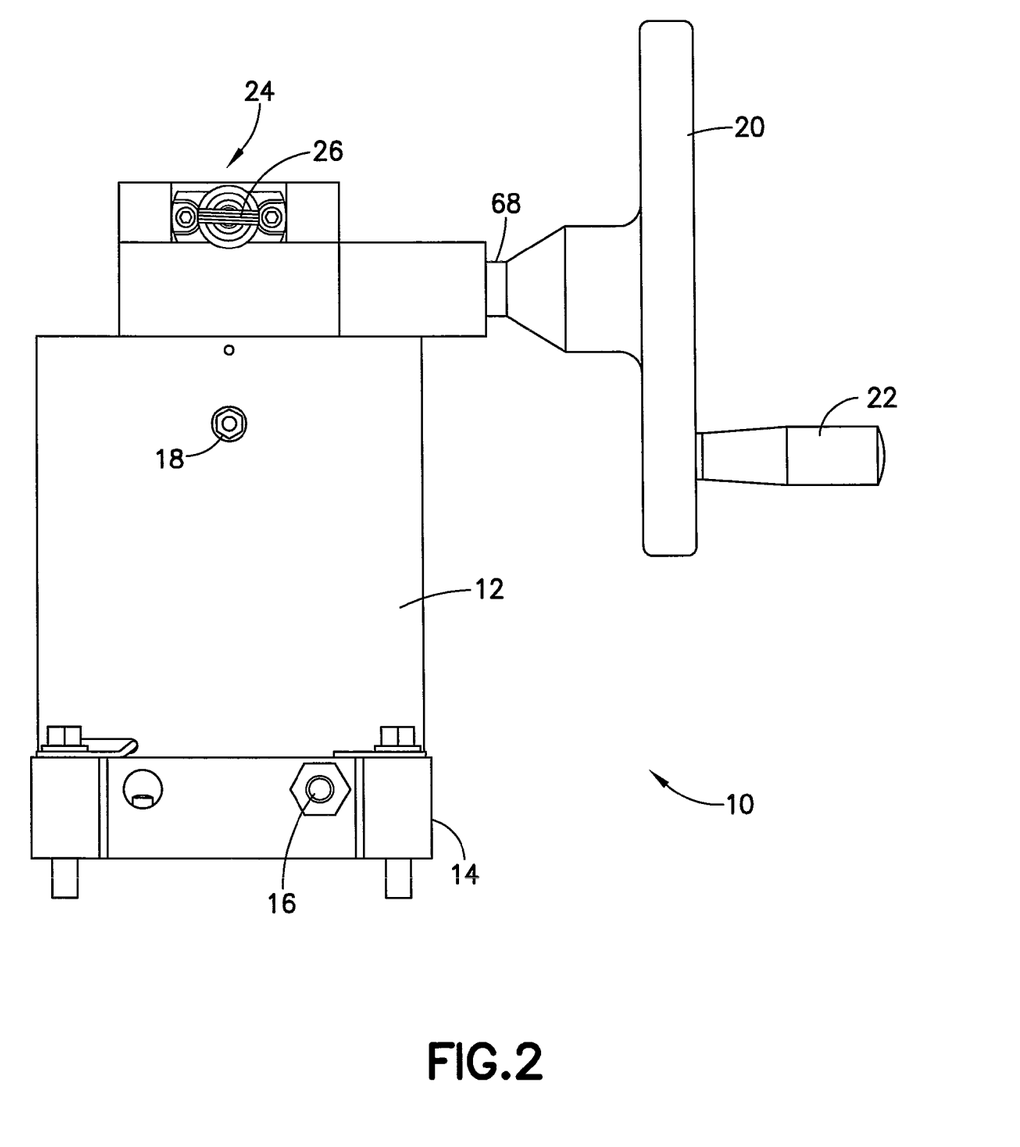
FIG. 2 is a side view of the spring-actuated parking brake shown in FIG. 1.
Figure 3:
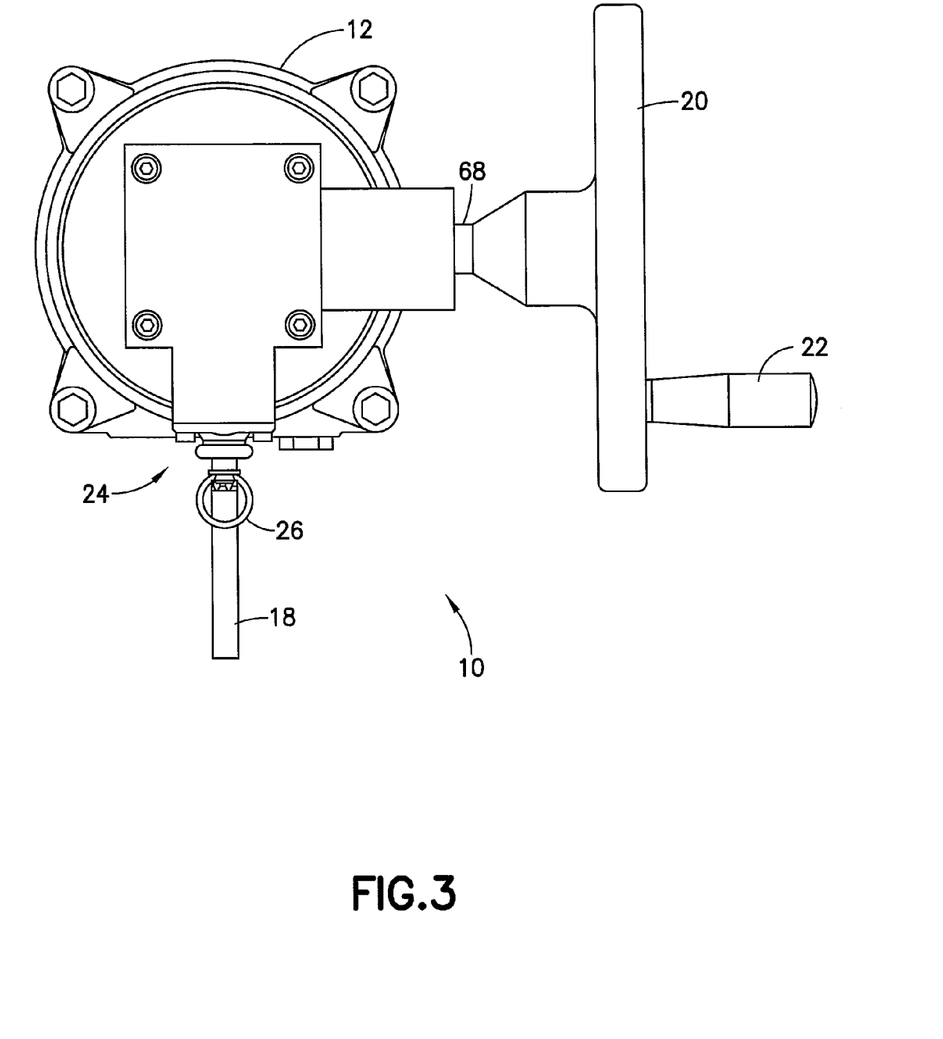
FIG. 3 is a top view of the spring-actuated parking brake shown in FIG. 1.

Referring to the drawings in which like reference characters refer to like parts throughout the several views thereof, the present disclosure is generally directed to a spring-applied parking brake for a railway vehicle which normally is released by use of pneumatic pressure. With reference to FIGS. 1-3, parking brake 10 includes a cylindrical body 12 having a sidewall and a base portion 14 with a pneumatic connector 16 adapted for connecting to a pneumatic line leading from a compressed pressurized air source. Pneumatic connector 16 is operative for delivering air to and/or from cylindrical body 12 for effecting a pneumatic release of parking brake 10. Cylindrical body 12 may include a vent 18 for exhausting air from unpressurized portion of cylindrical body 12 during application and release of parking brake 10.

A hand wheel 20 is provided with a handle 22 for manually releasing or reapplying parking brake 10 in case a pneumatic connection is unavailable. In another embodiment, the hand wheel 20 may be replaced by a fixed or a removable handle. A manual release pin mechanism 24 having a pullout pin 26 is operatively connected to hand wheel 20 to enable rotation of hand wheel 20 in order to manually reapply parking brake 10. Operating principle of parking brake 10 will be described hereafter with reference to FIGS. 4-7.

Figure 4:
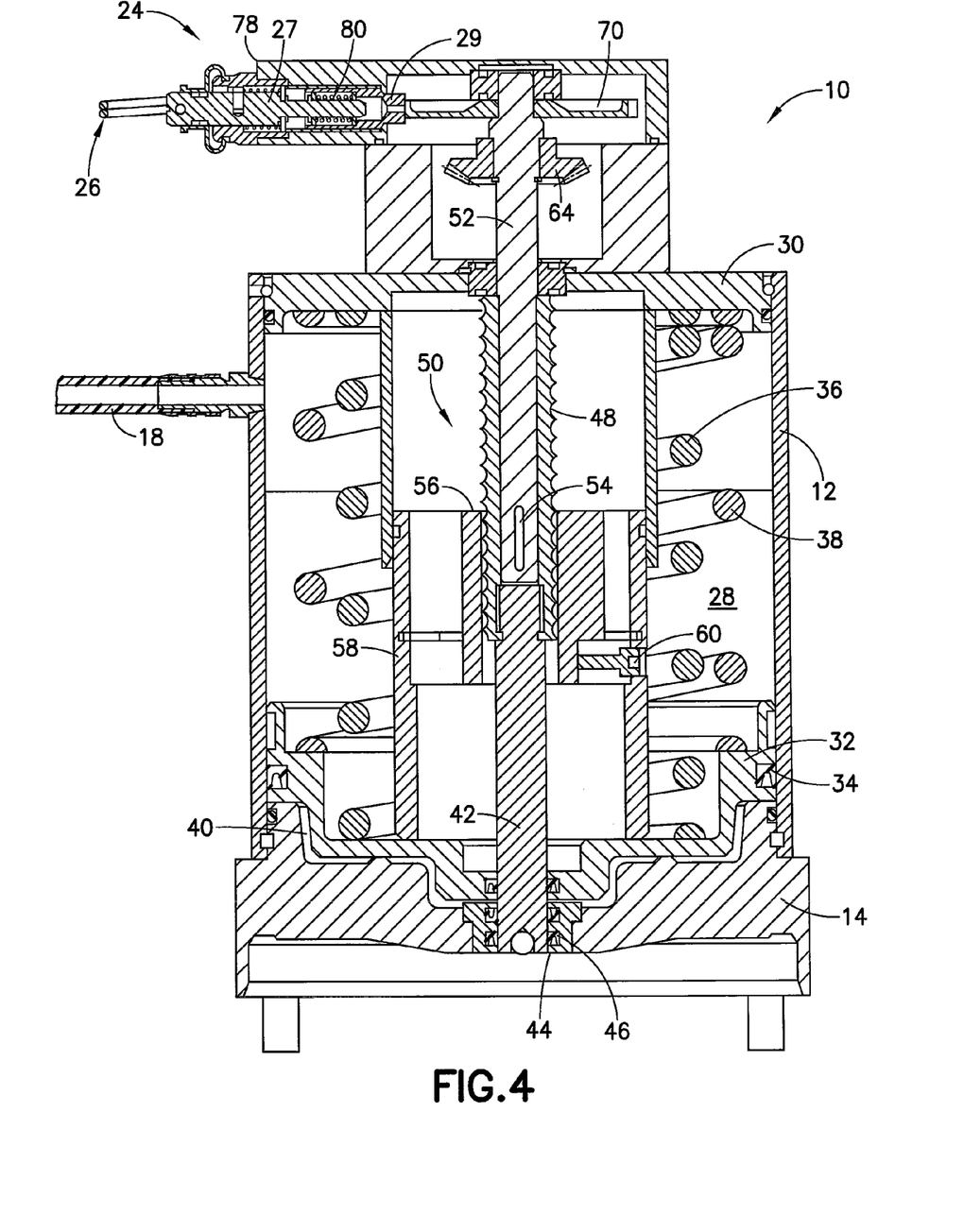
FIG. 4 is a cross-sectional view of the spring-actuated parking brake shown in FIG. 1 showing a manual release pin mechanism.
Figure 5:
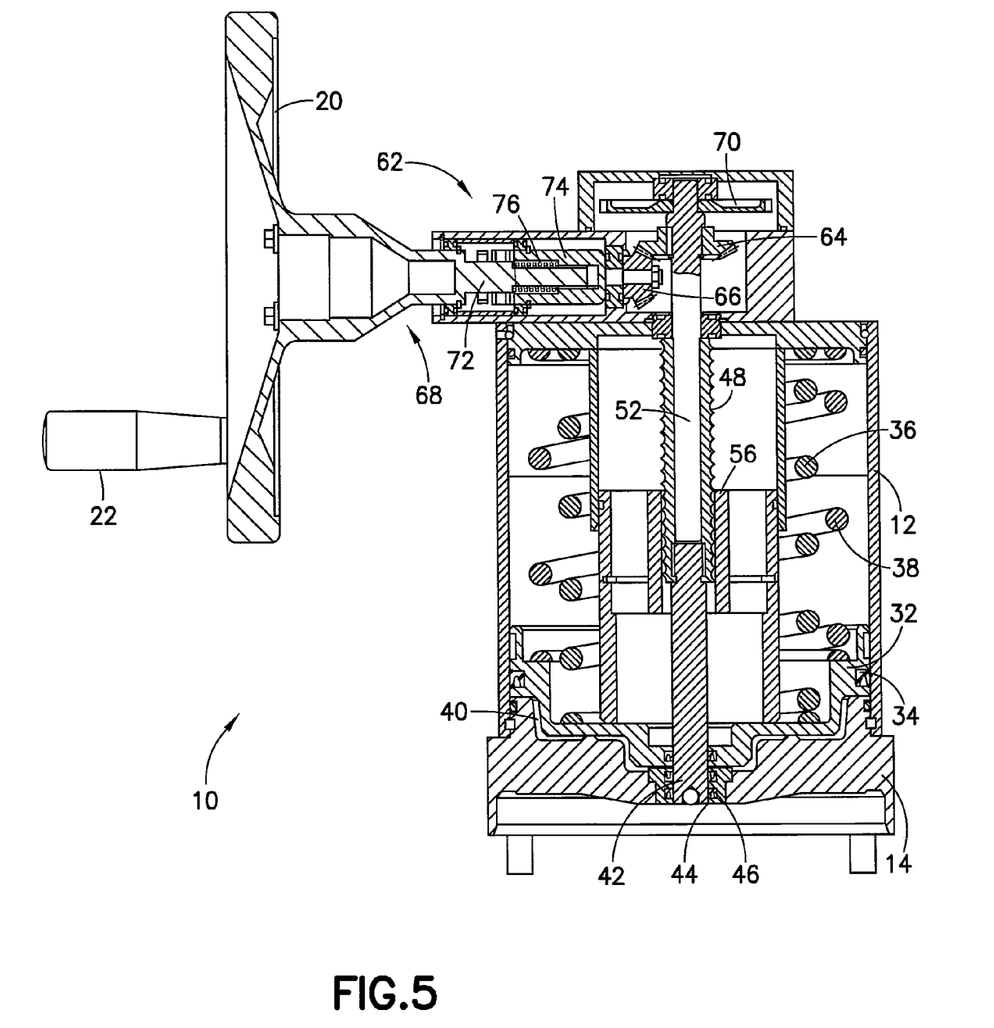
FIG. 5 is a cross-sectional view of the spring-actuated parking brake shown in FIG. 1 showing a hand wheel mechanism and a gear box.

Referring now to FIGS. 4-5, cross-sectional views of parking brake 10 illustrate the internal components of parking brake 10 with the parking brake 10 set in a manually released position. Cylindrical body 12 has a hollow construction having an internal cavity 28 with base portion 14 connected at one end and an annular wall 30 connected at the opposing end. A piston 32 is slidably positioned within internal cavity 28 of cylindrical body 12 and is sealed against the sidewall of internal cavity 28 by, for example, sealing member 34 disposed in an annular groove extending around an outer perimeter of piston 32. In one embodiment, sealing member 34 may be a U-shaped cup that engages the sidewall of cylinder body 12. A pair of concentric springs 36, 38 is positioned between annular wall 30 and piston 32 to bias piston 32 towards base portion 14. A cylinder 40 is defined between piston 32 and base portion 14. Cylinder 40 is in fluid communication with pneumatic connector 16 for introducing pressurized air into cylinder 40 and driving piston 32 toward annular wall 30 in order to disengage parking brake 10. Pressurizing cylinder 40 with compressed air delivered though pneumatic connector 16 causes piston 32 to move toward annular wall 30 against the pressure exerted by concentric springs 36, 38. Such movement of piston 32 within cylinder 40 effects a pneumatic release of parking brake 10. Should the air pressure be removed, springs 36, 38 will drive piston 32 back toward base portion 14.

Figure 7:
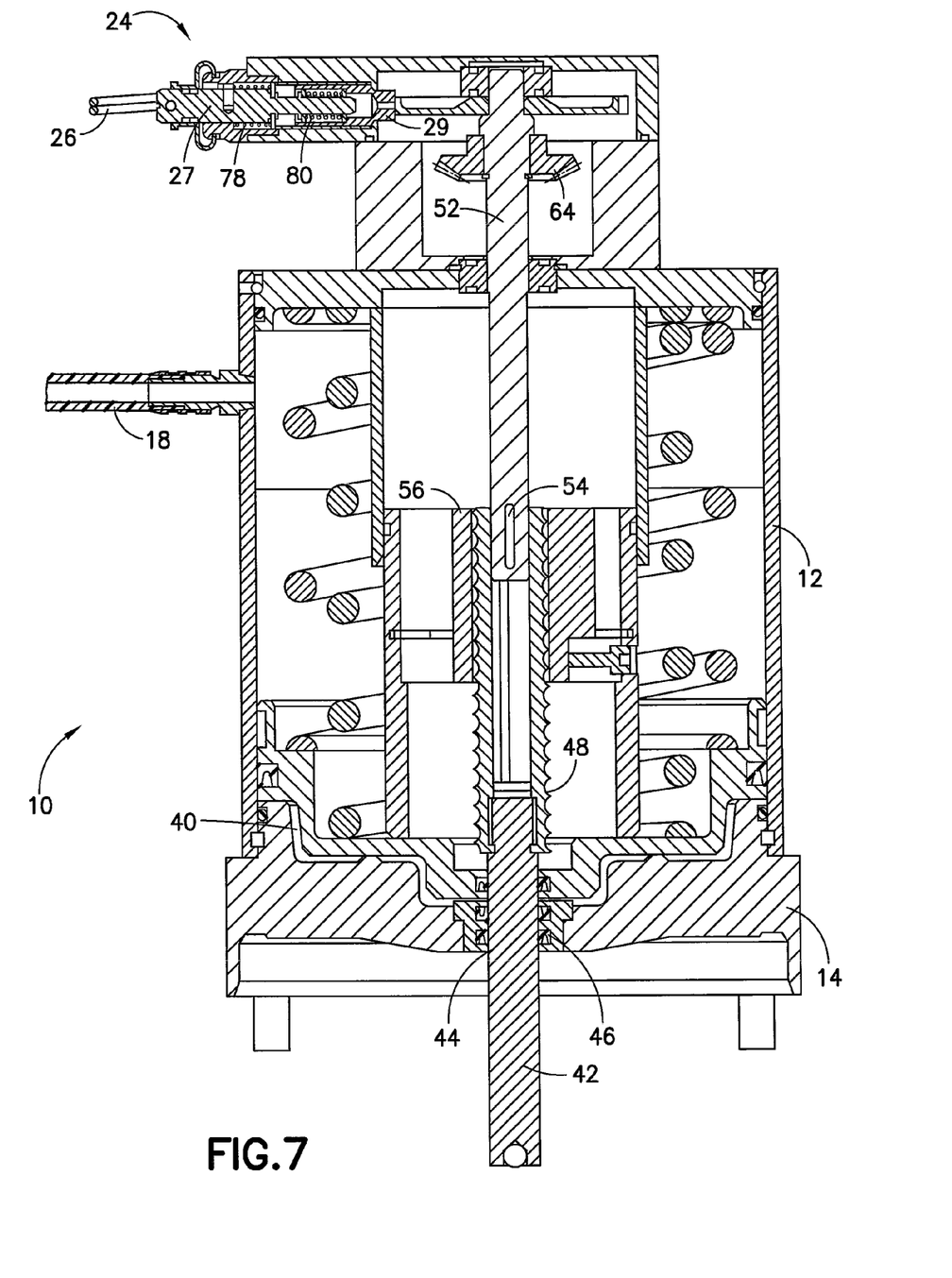
FIG. 7 is a cross-sectional view of the spring-actuated parking brake in an applied state.

A pushrod 42 is centrally positioned within cylinder 40 and is axially movable relative to base portion 14 and cylinder 40. In a position where parking brake is engaged, such as illustrated in FIG. 7, first end of pushrod 42 extends through a central opening 44 in base portion 14. Pushrod 42 is sealed at the interface with base portion 14 and cylinder 40 by one or more sealing members 46. In one embodiment, the one or more sealing members 46 may be a U-shaped cup adapted for engaging the sidewall of cylinder body 12.

With continuing reference to FIGS. 4-5, pushrod 42 is connected at its second end to a lower portion of a threaded shaft 48 of a ball screw reset mechanism 50 adapted for manually releasing and reapplying parking brake 10. Threaded shaft 48 is operatively connected to spindle 52 such that rotation of spindle 52 causes a corresponding rotation of threaded shaft 48. A helical thread extends around the exterior of threaded shaft 48. A hollow interior portion of threaded shaft 48 includes a key slot (not shown) extending throughout the length of threaded shaft 48. The key slot is adapted for receiving a key 54 extending through a lower portion of spindle 52. This structural arrangement permits threaded shaft 48 to slide axially with respect to the lower end of spindle 52 while allowing threaded shaft 48 to rotate with the rotation of spindle 52. Threaded shaft 48 engages a ball screw nut 56 that is fixed to a cylindrical sleeve 58 disposed around the collar. Cylindrical sleeve 58 is connected to an upper face of piston 32 such that axial movement of piston 32 causes a corresponding movement of cylindrical sleeve 58. In one embodiment, ball screw nut 56 is fixed to cylindrical sleeve 58 by a set screw 60. Because ball screw nut 56 is in a fixed relationship with cylindrical sleeve 58, rotation of spindle 52 causes a corresponding rotation of threaded shaft 48, which in turn causes threaded shaft 48 to move relative to ball screw nut 56. Operation of parking brake 10 to effect manual release and reapplication of the braking force will be described in greater detail hereafter.

With reference to FIG. 5, upper portion of spindle 52 extends through annular wall 30 and is engaged with a gear box 62. Gear box 62 provides for application of the winding action perpendicular to spindle 52 to be next described. As shown in FIG. 5, a first bevel gear 64 is provided on spindle 52 and a second bevel gear 66 is provided on a shaft 68 of hand wheel 20 such that rotation of hand wheel 20 causes a corresponding rotation of spindle 52 through the engagement of first bevel gear 64 and second bevel gear 66. In one embodiment, first and second bevel gears may have straight or spiral teeth. Gear box 62 allows for higher or lower winding speed and torque based on the ratio of the gear box. The first and second bevel gears may be selected to have a desired gear ratio to achieve a desired force input that is required to manually release parking brake 10. For example, in one embodiment, the first and second bevel gears may have a 2:1 ratio such that two full rotations of second bevel gear 66 cause one rotation of first bevel hear 64. One of ordinary skill in the art will appreciate that any desired gear ratio between the first and second bevel gears may be selected. In another embodiment, the hand wheel 20 is directly connected to the spindle 52 without the use of the gear box 62. In yet another embodiment, the gear box 62 may include spur-type gears such that the hand wheel 20 is parallel and radially offset relative to the spindle 52.

With reference to FIG. 4, top portion of spindle 52 has a toothed ratchet 70 that is selectively engagable with manual release pin mechanism 24. Pullout pin 26 is spring loaded by a first spring 78 and may be axially moved within a predetermined range of motion to engage to and from ratchet 70. Pullout pin 26 includes a first portion 27 and a second portion 29. In a default position, second portion 27 of pullout pin 26 is urged by a second spring 80 to engage ratchet 70 and prevent manual rotation of spindle 52. By manually withdrawing first portion 27 of pullout pin 26 from the default position, first spring 78 is compressed and second portion 29 of pulllout pin 26 is disengaged from ratchet 70, thereby allowing spindle 52 to rotate freely.

Referring to FIG. 5, shaft 68 includes a first shaft portion 72 that is releasably coupled to second shaft portion 74. A spring-loaded mechanism 76 biases second shaft portion 74 away from first shaft portion 72 in a default state when hand wheel 20 is not utilized, such as during manual release of the brakes, a pneumatic reapplication, or normal pneumatic operation. To affect engagement of second shaft portion 74 with first shaft portion 72, the force of spring-loaded mechanism 76 is overcome by axially pushing second shaft portion 74 toward first shaft portion 72 and turning second shaft portion 74 with respect to first shaft portion 72 until a pin on second shaft portion 74 engages a slot on first shaft portion 72. In another embodiment, the gear box 62 may be connected to the hand wheel 20 by selectively engagable gears within the gear box 62. For example, at least one of the selectively engagable gears may be mounted on a slidable shaft that is spring-loaded to affect the selective engagement with the other gear(s).

Figure 6:
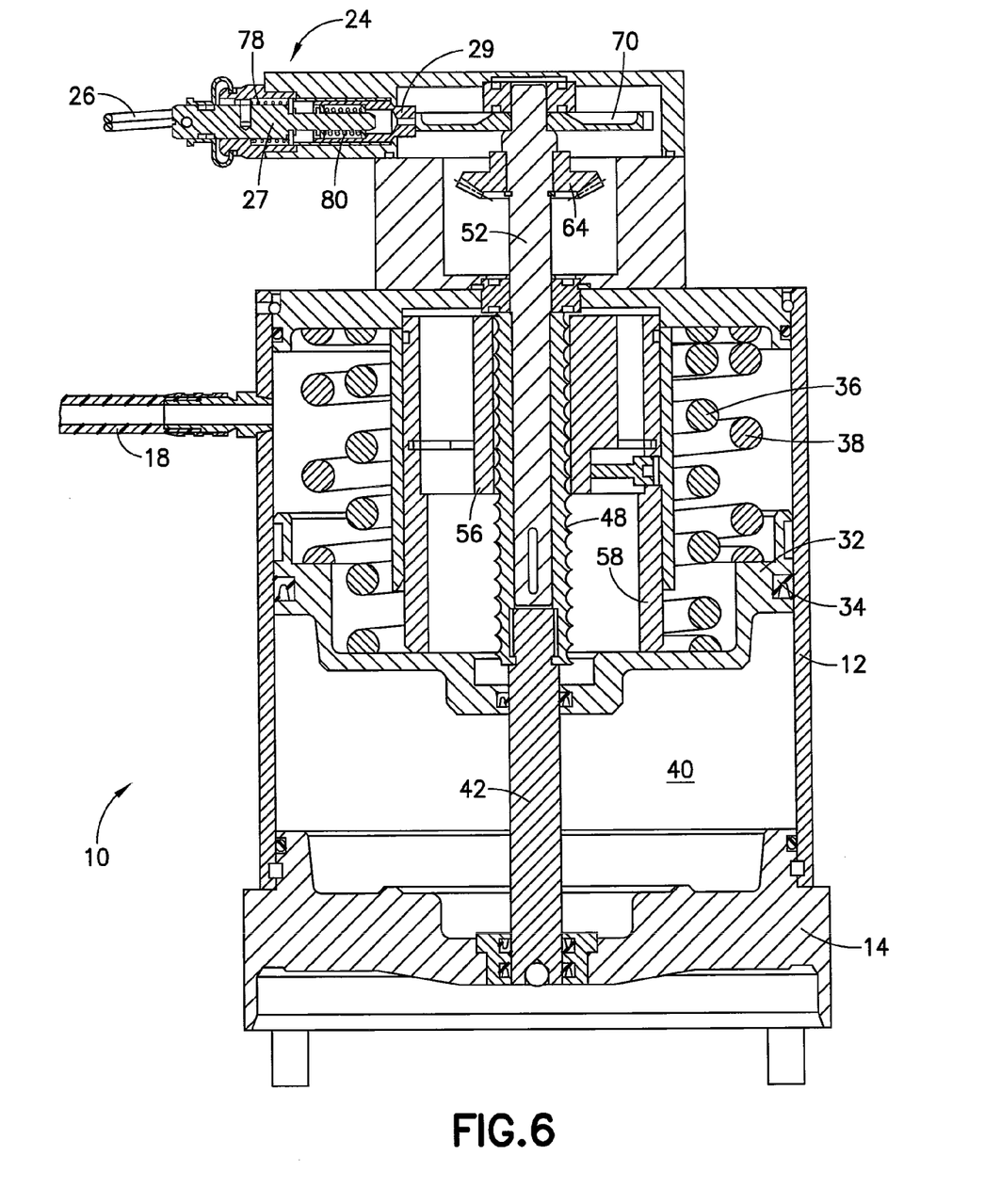
FIG. 6 is a cross-sectional view of the spring-actuated parking brake shown in FIG. 1 in a pneumatically-released state.

FIG. 7 shows parking brake 10 in an applied state, wherein piston 32 is located proximate to base portion 14 such that air is exhausted from cylinder 40. Because there is no air pressure acting on the piston face, concentric springs 36, 38 maintain piston 32 against base portion 14. While FIG. 7 illustrates the piston 32 abutting the surface of the base portion 14, a gap may exist therebetween such that the force of the concentric springs 36, 38 is transferred to the spindle 52. In the applied position, pushrod 42 applies a braking force via a linkage (not shown) to the service brake mechanism (not shown). In order to release parking brake 10, pressurized air may be introduced into cylinder 40 via pneumatic connector 16 to cause piston 32 to act against the force provided by concentric springs 36, 38. With reference to FIG. 6, piston 32 is moved upward as cylinder 40 is filled with compressed air, causing springs 36, 38 to be compressed. Upward motion of piston 32 withdraws pushrod 42 into cylinder 40 to disengage parking brake 10.

Once parking brake 10 has been set by the action of springs 36, 38 and pneumatic pressure is no longer available, such as when the railway vehicle is decoupled from the lead locomotive having a pressurized air source, parking brake 10 cannot be pneumatically released and must be released manually. In order to manually release parking brake 10, pullout pin 26 is disengaged from ratchet 70 to allow spindle 52 to rotate freely. Reaction force of the service brake against pushrod 42 to be driven into the retracted position. Upward movement of pushrod 42 causes threaded shaft 48 to rotate as it moves through ball screw nut 56, which consequently rotates spindle 52. In order to manually reapply parking brake 10, such as, for example, after rearranging the position of the railway vehicle in a railway yard, pullout pin 26 is returned to its default position where it engages ratchet 70. The user engages hand wheel 20 in order to manually force pushrod 42 into an extended position wherein it activates the brakes of the railway vehicle. Rotation of hand wheel 20 and shaft 68 is affected by axially pushing and rotating second shaft portion 74 toward first shaft portion 72 against the restoring force provided by spring-loaded mechanism 76 until the pin on second shaft portion 74 engages a corresponding slot on first shaft portion 72. Rotation of hand wheel 20 causes a corresponding rotation of shaft 68, which in turn rotates first bevel gear 64. As first bevel gear 64 is rotated, it engages second bevel gear 66 to cause a corresponding rotation of spindle 52. Rotation of spindle 52 causes a corresponding rotation of threaded shaft 48 when key 54 extending though spindle 52 engages a corresponding slot on threaded shaft 48. As threaded shaft 48 is rotated, it is advanced in an downward direction through ball screw nut 56. Because the lower end of threaded shaft 48 is connected to pushrod 42, downward movement of threaded shaft 48 also causes pushrod 42 to move downward, thereby engaging parking brake 10.

The parking brake 10 incorporating the ball screw reset mechanism 50 described above greatly improves the efficiency of manually reapplying the brake compared to existing methods and devices. Because of the inherent efficiency of ball screw design over conventional threads, the ball screw reset mechanism 50 significantly reduces the effort necessary to affect rotation of hand wheel 20, thereby allowing for easier operation. Additionally, the increased efficiency allows for the use of a higher gear reduction to reduce the number of turns of hand wheel 20 to reset parking brake 10.

While various embodiments of the spring-actuated parking brake having a ball screw reset mechanism were provided in the foregoing description, those skilled in the art may make modifications and alterations to these embodiments without departing from the scope and spirit of the invention. For example, it is to be understood that, to the extent possible, one or more features of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A spring-applied parking brake with manual release and reapply comprising:
   a pneumatic cylinder having a cylinder wall and a first wall provided opposite a second wall;
   a piston movable within the pneumatic cylinder and sealed relative to the cylinder wall;
   at least one spring extending between the piston and the second wall for biasing the piston against the first wall when the pneumatic cylinder is depressurized;
   a pneumatic pressure inlet for applying pressure to move the piston against the spring toward the second wall;
   a manual hand wheel;
   a spindle operatively connected to the manual hand wheel to affect movement of a manual reset mechanism; and
   a pushrod connected to the manual reset mechanism and extending through the cylinder and the first wall,
   wherein, when the hand wheel is rotated manually, the manual reset mechanism is rotated and causes the pushrod to move relative to the piston corresponding to the direction of the rotation of the hand wheel, and
   wherein the manual reset mechanism comprises a threaded shaft having a first end slidably connected to a first end of the spindle and a second end connected to the pushrod, and a ball screw nut rotatably engaged with the threaded shaft, and wherein a second end of the spindle is engaged to a release pin mechanism.

2. The spring-applied parking brake according to claim 1, wherein the ball screw nut is fixedly positioned relative to the piston.

3. The spring-applied parking brake according to claim 1, wherein the threaded shaft is hollow and includes a key slot for slidably engaging a key extending through the spindle.

4. The spring-applied parking brake according to claim 1, wherein the ball screw nut is set within a sleeve connected to the piston.

5. The spring-applied parking brake according to claim 1, wherein the at least one spring is a pair of concentric springs.

6. The spring-applied parking brake according to claim 1, wherein the hand wheel is connected to a gear box having a first bevel gear engaging a second bevel gear.

7. The spring-applied parking brake according to claim 6, wherein the first and second bevel gears have straight or spiral teeth.

8. The spring-applied parking brake according to claim 1, wherein a second end of the spindle has a toothed ratchet releasably engaged to the release pin mechanism.

9. The spring-applied parking brake according to claim 8, wherein the release pin mechanism includes a spring-loaded pullout pin that is selectively engagable with the toothed ratchet.

10. The spring-applied parking brake according to claim 1, wherein the manual hand wheel is connected to a gear box by a shaft having a first shaft portion selectively engagable with a second shaft portion or by selectively engagable gears within the gear box.

11. The spring-applied parking brake according to claim 10, wherein the first shaft portion and the second shaft portion are selectively engagable via a spring-loaded mechanism.

12. A parking brake for a railway vehicle comprises:
a pneumatic cylinder having a cylinder wall and first wall provided opposite a second wall;
a piston movable within the pneumatic cylinder and sealed relative to the cylinder wall;
at least one spring extending between the piston and the second wall for biasing the piston against the first wall when the pneumatic cylinder is depressurized;
a pneumatic pressure inlet for applying pressure to move the piston against the spring toward the second wall;
a manual hand wheel;
a spindle operatively connected to the hand wheel to affect movement of a manual reset mechanism having a threaded shaft with a first end slidably connected to a first end of the spindle and a second end connected to the pushrod, and a ball screw nut rotatably engaged with the threaded shaft; and
a pushrod connected to the manual reset mechanism and extending through the cylinder and the first wall,
wherein, when the hand wheel is rotated manually, the manual reset mechanism is rotated and causes the pushrod to move relative to the piston corresponding to the direction of the rotation of the hand wheel.

13. The parking brake according to claim 12, wherein the threaded shaft is hollow and includes a key slot for slidably engaging a key extending through the spindle.

14. The parking brake according to claim 12, wherein the ball screw nut is fixedly positioned relative to the piston.

15. The parking brake according to claim 12, wherein the ball screw nut is set within a sleeve connected to the piston.

16. The parking brake according to claim 12, wherein the at least one spring is a pair of concentric springs.

17. The parking brake according to claim 12, wherein the hand wheel is connected to a gear box having a first bevel gear engaging a second bevel gear.

18. The parking brake according to claim 12, wherein the hand wheel is connected to a gear box by a shaft having a first shaft portion selectively engagable with a second shaft portion or by selectively engagable gears within the gear box.

* * * * *

UNITED STATES PATENT AND TRADEMARK OFFICE
CERTIFICATE OF CORRECTION

PATENT NO.        : 9,085,309 B2
APPLICATION NO.   : 14/096200
DATED             : July 21, 2015
INVENTOR(S)       : Peter D. Mathern et al.

It is certified that error appears in the above-identified patent and that said Letters Patent is hereby corrected as shown below:

Claims

Column 6, Line 55, Claim 1, delete "manual"

Column 6, Line 56, Claim 1, delete "and"

Column 6, Line 62, Claim 1, delete "and"

Column 7, Line 28, Claim 10, delete "manual"

Column 7, Line 36, Claim 12, after and, insert -- a --

Column 8, Line 12, Claim 12, delete "the" and insert -- a --

Column 8, Line 15, Claim 12, delete "a" and insert -- the --

Signed and Sealed this
Twenty-ninth Day of March, 2016

Michelle K. Lee
*Director of the United States Patent and Trademark Office*